US 6,643,236 B2

(12) United States Patent
Chiang

(10) Patent No.: US 6,643,236 B2
(45) Date of Patent: Nov. 4, 2003

(54) METHOD OF ELIMINATION OF INTERFERENCE CREATED BY CDR/W RUN-OUT MOTOR ON SLEDGE SERVERS

(75) Inventor: Jen-Cheng Chiang, Taipei (TW)

(73) Assignee: Behavior Tech Computer Corporation, Taipei (TW)

( * ) Notice: Subject to any disclaimer, the term of this patent is extended or adjusted under 35 U.S.C. 154(b) by 0 days.

(21) Appl. No.: 09/900,870

(22) Filed: Jul. 10, 2001

(65) Prior Publication Data
US 2003/0026184 A1 Feb. 6, 2003

(51) Int. Cl.[7] ................................................ G11B 7/00
(52) U.S. Cl. ................ 369/53.14; 369/53.3; 369/44.26; 369/44.32; 360/77.04; 360/73.03
(58) Field of Search .......................... 369/53.43, 53.14; 360/77.04

(56) References Cited

U.S. PATENT DOCUMENTS

| 3,983,468 | A | * | 9/1976 | Maitrias | 318/685 |
| 4,419,701 | A | * | 12/1983 | Harrison et al. | 360/77.04 |
| 5,406,535 | A | * | 4/1995 | Seo et al. | 369/44.28 |
| 5,999,357 | A | * | 12/1999 | Serrano | 360/73.02 |
| 6,018,432 | A | * | 1/2000 | Ukani | 360/69 |
| 6,128,153 | A | * | 10/2000 | Hasegawa et al. | 360/77.08 |
| 6,147,467 | A | * | 11/2000 | Yu et al. | 318/561 |
| 6,292,324 | B1 | * | 9/2001 | Ho et al. | 360/77.04 |
| 6,445,650 | B1 | * | 9/2002 | Tsai | 369/30.17 |
| 6,469,962 | B2 | * | 10/2002 | Chu | 369/44.28 |

* cited by examiner

Primary Examiner—Aristotelis M. Psitos
(74) Attorney, Agent, or Firm—Rosenberg, Klein & Lee

(57) ABSTRACT

A method of elimination of interference created on CDR/W run-out motors on sledge servers, especially for the elimination of interference created by the run-out of the combination of CDR/W spindle motor on track-seeing servers, where a general evaluating device is provided linking the controller output of the data access module driven by the sledge server motor and the final track signal output, including a speed evaluating device and a run-out evaluating device that may have access to the run-out factor of the CDR/W motor and the CD in the data access module for evaluation of the elimination function of the speed and the run-out tolerance, so that the run-out evaluating device could emit run-out compensation signals for amplification by a relay amplifier and the spindle motor synchronized signal before a negative feedback calculation by playing the final output signal of the module, with access to a play control signal for the elimination of run-out to the CDR/W sledge server, so that the CD may be read, written or accessed more steadily.

4 Claims, 2 Drawing Sheets

METHOD OF ELIMINATION OF INTERFERENCE CREATED BY CDR/W RUN-OUT MOTOR ON SLEDGE SERVERS

BACKGROUND OF THE INVENTION

This invention relates to a method of elimination of interference created on CDR/W run-out motors on sledge servers, in particular to a method for elimination of run-out factors on CDR/W spindle motors with CDs.

Whereas CDR/Ws are in wide use on A/V and computer data systems in our daily life and these systems are key equipment to playing A/V data and access to computer information; however, in the CDR/W access mechanism, steadiness of the configuration of the synchronous motor that drives the CD to spin and the CD would be key to accuracy and quality of dada reading and writing on them; as a result, sound configuration and adjustment of the motor and the CD would be critical.

Nevertheless, in known CDR/Ws, regardless a CDR/W or a CD-ROM, under data access mode or play mode, a different configuration of CD and CDR/W motor would create different run-out factors, which would affect the sledge server control signals, forcing the control signals emitted by the sledge controllers experience tolerances because of these factors, examples are variable current levels and phases that would make the photo head deviate and when a CD is being played or data accessed, trip, wrong data and unsteady play would result.

In the production line, when a manually selected motor is used for tests and adjustments, with the purpose of minimizing working hours, labor and cost; besides, experienced hands and tests are not enough to eliminate all run-out factors created by the configuration of CDs and motors, as when the CD is running, said run-out would result to keep the CDR/W from running smoothly.

The main objective of the invention is to provide a method of elimination of interference created on CDR/W run-out motors on sledge servers, so that the run-out factors created between CDR/W motor and the CD could be fully eliminated.

Another objective of the invention is to provide a method of elimination of interference created on CDR/W run-out motors on sledge servers, by means of the configuration of closed-circuit speed evaluating device and run-out evaluating device as well as the compensation control mode, run-out factors created by different configurations of CDR/W and CD motors could be eliminated successfully.

Still another objective of the invention is to provide a method of elimination of interference created on CDR/W run-out motors on sledge servers, for automatic elimination of run-out factors without going through manual tests and adjustments, before minimizing labor, working hours and cost required by the production of CDR/Ws.

DETAILED DESCRIPTION OF THE INVENTION

Figure 1:
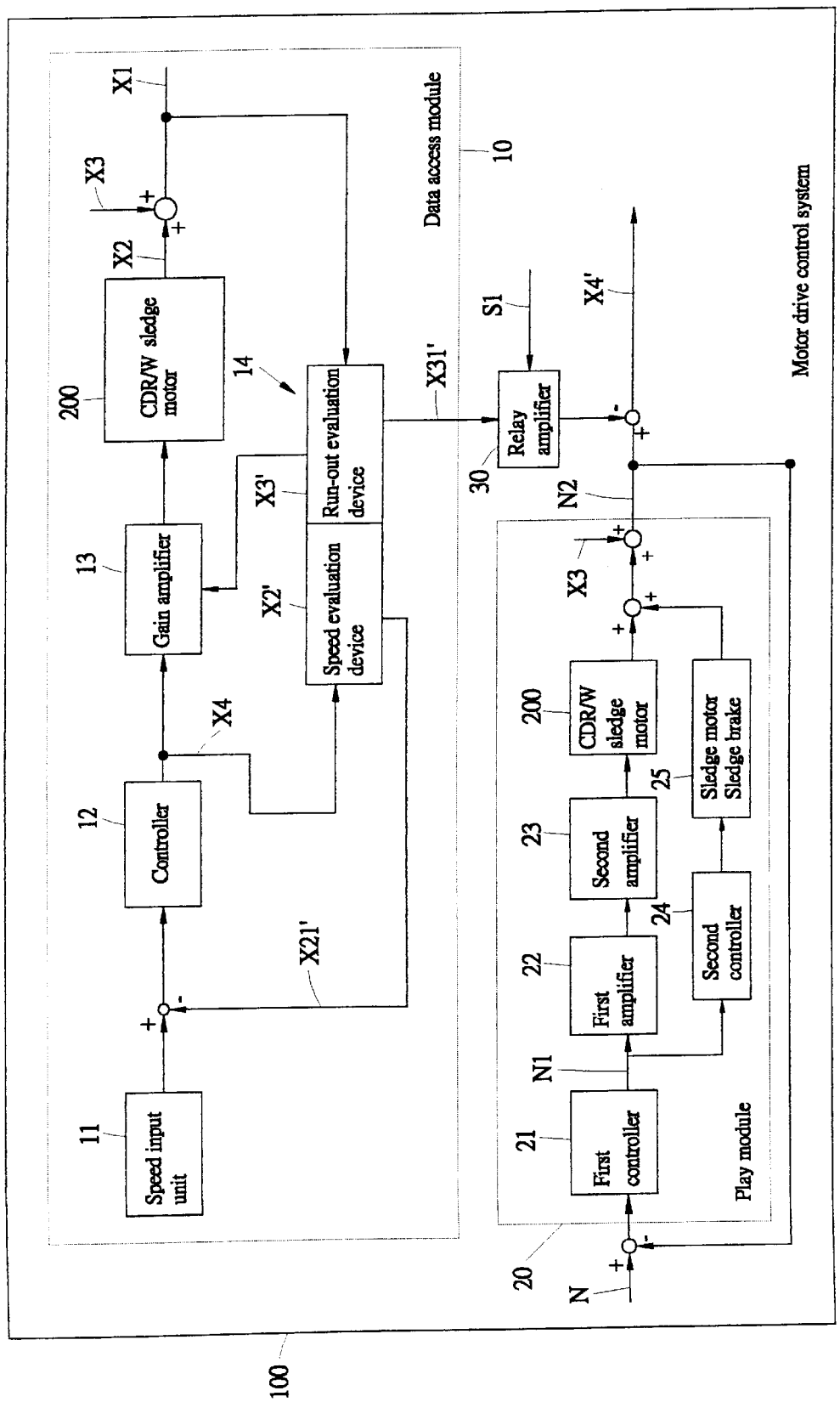
FIG. 1 shows the control system diagram of the invention.

FIG. 1 shows the drive control system diagram of the sledge motor of this invention, where the sledge motor drive control system is numbered 100. The sledge motor drive control system 100 comprises a data access module 10 and a play module 20. The data access module 10 comprises a speed input unit 11, a controller 12, a gain amplifier 13 that come in serial while controlling the feedback of the rpm of the CDR/W sledge motor. In the CDR/W data reading, writing access mode, the CDR/W sledge motor 200 controls the data reading, writing access speed, meaning speed control of the CDR/W sledge motor 200.

The rpm output of the CDR/W sledge motor 200 of the data access module is marked with X2 and a run-out factor X3. The subject of evaluation of this invention is added between the final output X1. The signal of rpm output X2 and the final rpm output X1 is accomplished with the photo crane signal with feedback to feedback to the sledge server system for the elimination of run-out factors. The output X4 of the controller 12 comes with a general evaluation device 14, which comprises a speed evaluation device X2' and a run-out evaluation device X3', which receive respectively the speed and run-out signal feedback from the output X4 and the final output X1 of the controller. After calculation by the speed evaluation device X2', a speed adjustment signal X21' and speed input unit 11 are sent back for feedback calculation, the output rpm of the CDR/W sledge motor 200 could be properly adjusted. After calculation of the run-out evaluation device X3', a run-out elimination signal X31' is emitted to a relay amplifier 30 for run-out elimination. A detailed run-out elimination process is given in the following.

Besides, the play module 20 comes with a first controller 21, the second controller 24, the first amplifier 22, the second amplifier 23 and the sledge motor brake 25, where the first controller 21 is for the calculation of play module signal N, so that the sledge system stability and output track controls signal N1 to the second controller 24 and the first amplifier 22. The speed control circuit formed by said second controller 24 and the first amplifier 22 could carry out position controls over the CDR/W sledge motor 200. Besides, through the second amplifier 23 and the sledge brake 25, reader position signal is obtained and after adding run-out factor X3, a real output signal N2 is formed. The relay amplifier 30 receives run-out elimination signal X31' from the data access module 10 and motor rpm synchronous signal S1 for relay amplification before compensation calculation with the real output signal N2 of said play module 20, so that a final output position control signal X4' is obtained. The final output position control signal X4' can eliminate the run-out factor X3' between the CD and the CDR/W sledge motor 200, thus forming a circuit control system with compensation for the elimination of run-out.

The individual block circuits in the motor driving control system 100 of the invention, such as speed input unit II, controller 12, gain amplifier 13, the first controller 21, the second controller 24, the first amplifier 22, the second amplifier 23, the sledge motor brake 25 and the relay amplifier 30 of different patterns may be physical circuits or a simulated software in the microprocessor.

Figure 2:
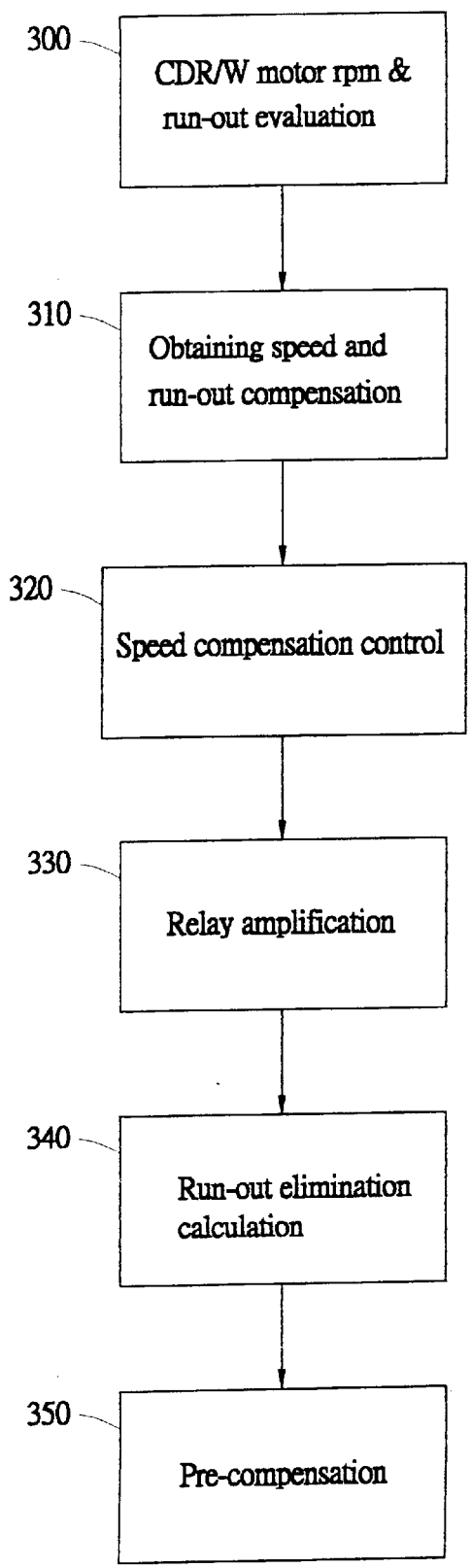
FIG. 2 shows the flow process of elimination of interference created by the CDR/W run-out on the sledge server systems.

FIG. 2 shows the method of this invention and its physical operation steps, including:

(300) CDR/W motor rpm and run-out evaluation, for feedback evaluation on rpm and run-out data feedback evaluation on CDR/W sledge motor 200 with general evaluation device 14 in data access module 10;

(310) to obtain speed and run-out compensation, that is to say, to obtain speed tolerance and run-out factor X3' in the general evaluation device 14 and to carry out speed compensation and run-out compensation calculations with results;

(320) speed compensation control, that is to say, by using speed evaluation device X2' and feedback speed compensation signals, feedback calculations are conducted with input signal of speed input unit 11 for negative feedback calculations, making the rpm of CDR/W be properly adjusted;

(330) relay amplification processing by magnifying the run-out elimination signal X31' of the relay amplifier and the motor rpm signal S1 with calculation;

(340) run-out elimination calculation by performing negative feedback calculations of the real output signal N2 in said output and play module 20 of the relay amplifier 30, to obtain the final output control signal X4', where the run-out factor X3' of the CD and CDR/W sledge motor 200 have been filly eliminated from the composition;

(350) pre-compensation process by conducting pre-compensation calculations of the final output control signal X4' and play control signal N1 in the play module 20, so that the CDR/W sledge motor 200 is capable of eliminating run-out interference during operation of the CDR/W sledge motor.

In the following we like to give further description of the calculation mode and method of the speed evaluation device X2' in the general evaluation device 14 and the calculation mode of the run-out evaluation device X3' as well as the method of run-out elimination. In the following we like to give a number of calculation functions for your reference. However, these embodiments are only given to show the method of the invention, not as limits to any application. Before describing relevant calculation functions and for the purpose of successful comparison, we have to set up the calculation mode of known control systems, where:

$$\begin{bmatrix} X1(K+1) \\ X2(K+1) \\ X3(K+1) \\ X4(K+1) \end{bmatrix} = \begin{bmatrix} A_{11} & A_{12} & 0 & 0 \\ A_{21} & A_{22} & 0 & 0 \\ 0 & 0 & A_{dis11} & A_{dis12} \\ 0 & 0 & A_{dis21} & A_{dis22} \end{bmatrix} \begin{bmatrix} X1(K) \\ X2(K) \\ X3(K) \\ X4(K) \end{bmatrix} + \begin{bmatrix} B_{11} \\ B_{22} \\ 0 \\ 0 \end{bmatrix} u(K) \quad (A)$$

$$Y(K) = \begin{bmatrix} 1 & 0 & 1 & 0 \end{bmatrix} \begin{bmatrix} X1(K) \\ X2(K) \\ X3(K) \\ X4(K) \end{bmatrix} \quad (B)$$

In the aforementioned functions, (A) and (B), X1 (K) represent the signal functions of the final output X1 in the data access module 10 of FIG. 1; X2 (K) stands for the signal function of the rpm output X2; X3 (K) indicates the arithmetic function of the run-out factor X3; X4 (K) is the output signal arithmetic function of controller 12. On the other side, Y (K) is the interference composition function, including the calculation factor for both the final output X1 and the run-out factor X3, and there is no way to produce the function or method of the run-out factor X3. U (K) indicates unit step function and the parameters in the matrixes such as $A_{11}, A_{12}, A_{21}, A_{22}, A_{dis11}, A_{dis12}, A_{dis21}, A_{dis22}$ and $B_{11}, B_{22}$ are all amplification scale parameters of the system run-out parameters.

The following shows the function formats (C) and (D) of the motor-driven control system 100 given in this invention for comparison with the function formats (A) and (B) of the known systems as mentioned above, where:

$$\begin{bmatrix} X2(K+1) \\ X3(K+1) \\ X4(K+1) \end{bmatrix} = \begin{bmatrix} A_{22} & 0 & 0 \\ 0 & A_{dis11} & A_{dis12} \\ 0 & A_{dis21} & A_{dis22} \end{bmatrix} \begin{bmatrix} X2(K) \\ X3(K) \\ X4(K) \end{bmatrix} + \begin{bmatrix} B_{22} \\ 0 \\ 0 \end{bmatrix} u(K) + \begin{bmatrix} A_{21} \\ 0 \\ 0 \end{bmatrix} X1(K) \quad (C)$$

$$Y(K) = \begin{bmatrix} 0 & 1 & 0 \end{bmatrix} \begin{bmatrix} X2(K) \\ X3(K) \\ X4(K) \end{bmatrix} \quad (D)$$

as known:

$$X1(K+1) = A_{11} \cdot X1(K) + B_{11} \cdot u(K) + \begin{bmatrix} A_{12} & 0 & 0 \end{bmatrix} \begin{bmatrix} X2(K) \\ X3(K) \\ X4(K) \end{bmatrix}$$

In the aforementioned formats X1 (K), X2 (K), X3 (K), X4 (K), u (K) $A_{11}, A_{12}, A_{21}, A_{22}, A_{dis11}, A_{dis12}, A_{dis21}, A_{dis22}$ and $B_{11}, B_{22}$, the format (A) has the same definition that of format (B), while Y' (K) stands for the final interference function of this invention. This clearly shows that it contains only run-out factor X3 function X3 (K), so that we can find out the format and method for the elimination of this run-out factor X3.

In the following, formats (E), (F), (G), (H), (I), (J), (K), (L) and (M) are duly defined for the different matrixes or parameters in function (C) and the new calculation function (N) is given as follows:

$$\Phi = \begin{bmatrix} A_{22} & 0 & 0 \\ 0 & A_{dis11} & A_{dis12} \\ 0 & A_{dis21} & A_{dis22} \end{bmatrix} \quad (E)$$

$$P_a = \begin{bmatrix} B_{22} \\ 0 \\ 0 \end{bmatrix} \quad (F)$$

$$\Phi_a = \begin{bmatrix} A_{21} \\ 0 \\ 0 \end{bmatrix} \quad (G)$$

$$H = [A_{12} \ 0 \ 0] \quad (H)$$

$$\Phi_{aa} = A_{11} \quad (I)$$

$$P_{aa} = B_{11} \quad (J)$$

$$X'_b(K) = \begin{bmatrix} X2(K) \\ X3(K) \\ X4(K) \end{bmatrix} \quad (K)$$

$$X_a(K) = X1(K) \quad (L)$$

$$L_{rp} = \begin{bmatrix} L_{rp1} \\ L_{rp2} \\ L_{rp3} \end{bmatrix} \quad (M)$$

$$X'_b(K) = \Phi X'_b(K-1) + \Phi X_a(K-1) + P_a u(K-1) + \quad (N)$$
$$L_{rp}[X_a(K) - \Phi_{aa} X_a(K-1) - P_{aa} u(K-1) - H X'_b(K-1)]$$

where, matrix $L_{rp}$ is the reduced command parameter for the elimination of run-out, then function (N) is simplified into another format (O) as follows:

$$X'_b(K) = [\Phi - L_{rp} H] X'_b(K-1) + [\Phi_a - L_{rp} \Phi_{aa}] X_a(K-1) + [P_a - L_{rp} P_{aa}] u(K-1) + L_{rp} X_a(K) \ldots (O)$$

so that the following calculation step can be successfully carried out.

The final result produced by the control format (O) in this invention is directly connected to the data access module 10 and the play module 20 in FIG. 1, so that the formats (P) and (Q) can be made into:

where, X2'(K) stands for the calculation function of the speed evaluation device X2' in the general evaluation device 14; and X3'(K) represents the calculation function of the run-out evaluation device X3' and X4'(K) stands for the arithmetic function of the final output control signal X4' in the play module 20. Accordingly, with the equation given in formats (P) and (Q), we can then have the calculation functions X2' (K) and X3' (K) for both the speed evaluation device X2' and the run-out evaluation device X3', of which the detailed control formats are given in the formats (R) and (S);

$$X2'(K) = (A_{22} - L_{rp1} A_{12}) X2'(K-1) + \quad (R)$$
$$(A_{21} - L_{rp1} A_{11}) X1(K-1) u($$
$$X1(K)$$

$$X3' = -L_{rp2} A_{12} \quad (S)$$
$$L_{rp2}$$
$$X1(K)$$

Therefore, with the calculation functions X2'(K) and X3'(K) for both the speed evaluation device X2' and the run-out evaluation device X3' in this invention, we can then learn that the method referred in this invention can be applied on a wide variety of configurations of CDs and CDR/W sledge motors, where the run-out factor X3 can be subject to compensation elimination by means of this automatic run-out system and method; besides, these calculation functions and methods can be directly converted into calculator program for writing into microprocessors or driving programs. Though this invention does not aim to discuss the software program.

This invention is to conduct, based on the spirit of automatic evaluation of the elimination method based on the most simple and effective as well as closed run-out factors, automatic elimination of run-out produced by the CDR/W driving motors and the different CDs, so that the data access and play of the CDs could be further upgraded in terms of steadiness and reliability, as a way to reduce the cost of $$\begin{bmatrix} X2'(K) \\ X3'(K) \\ X4'(K) \end{bmatrix} = \left\{ \begin{bmatrix} A_{22} & 0 & 0 \\ 0 & A_{dis11} & A_{dis12} \\ 0 & A_{dis21} & A_{dis22} \end{bmatrix} - \begin{bmatrix} L_{rp1} A_{12} & 0 & 0 \\ L_{rp2} A_{12} & 0 & 0 \\ L_{rp3} A_{12} & 0 & 0 \end{bmatrix} \right\} \begin{bmatrix} X2'(K-1) \\ X3'(K-1) \\ X4'(K-1) \end{bmatrix} + \quad (P)$$

$$\left\{ \begin{bmatrix} A_{21} \\ 0 \\ 0 \end{bmatrix} - \begin{bmatrix} L_{rp1} A_{11} \\ L_{rp2} A_{11} \\ L_{rp3} A_{11} \end{bmatrix} \right\} X1(K-1) + \left\{ \begin{bmatrix} B_{22} \\ 0 \\ 0 \end{bmatrix} - \begin{bmatrix} L_{rp1} B_{11} \\ L_{rp2} B_{11} \\ L_{rp3} B_{11} \end{bmatrix} \right\} u(K-1) +$$

$$\begin{bmatrix} L_{rp1} \\ L_{rp2} \\ L_{rp3} \end{bmatrix} X1(K)$$

$$= \begin{bmatrix} (A_{22} - L_{rp1} A_{12}) & 0 & 0 \\ -L_{rp2} A_{12} & A_{dis11} & A_{dis12} \\ -L_{rp3} A_{12} & A_{dis21} & A_{dis22} \end{bmatrix} \begin{bmatrix} X2'(K-1) \\ X3'(K-1) \\ X4'(K-1) \end{bmatrix} + \begin{bmatrix} (A_{21} - L_{rp1} A_{11}) \\ -L_{rp2} A_{11} \\ -L_{rp3} A_{11} \end{bmatrix} \quad (Q)$$

$$X1(K-1) + \begin{bmatrix} (B_{22} - L_{rp1} B_{11}) \\ -L_{rp2} B_{11} \\ -L_{rp3} B_{11} \end{bmatrix} u(K-1) + \begin{bmatrix} L_{rp1} \\ L_{rp2} \\ L_{rp3} \end{bmatrix} X1(K)$$

configuration of the CDR/W on the production line, making this invention industrially applicable.

What is claimed is:

1. A method of eliminating the effects of run-out on a sledge server for a CDR/W device comprising the steps of:
   (a) establishing a sledge server motor;
   (b) applying a speed control signal generated by said controller to drive said sledge server motor, said sledge server generating responsive thereto a motor speed output signal;
   (c) generating a run out factor signal indicative of a sensed run out factor;
   (d) combining at least said motor speed output and run out factor signals to generate a combined speed signal generating a run out elimination signal, comparing said run out elimination signal to a preset synchronization signal, and generating a position control signal responsive to said comparison;
   (e) automatically evaluating said combined speed signal to generate responsive thereto a speed adjustment signal; and,
   (f) feeding back said speed adjustment signal for adjusting said speed control signal to dynamically compensate for run out, wherein one of a data access mode of operation and a play mode of operation is selectable, said steps (a) through (f) being operable in each of said modes of operation.

2. A system for eliminating the effects of run-out on a sledge server for a CDR/W device comprising:
   (a) a sledge server motor;
   (b) a controller coupled to said server motor, said controller being operable to generate a speed control signal to drive said sledge server motor, said sledge server motor being operable to generate responsive thereto a motor speed output signal;
   (c) a combiner coupled to said sledge server motor for combining at least said motor speed output signal and a run out factor signal indicative of a sensed run out factor;
   (d) a feedback loop extending from said combiner to said controller, said feedback loop including a general evaluation unit, said general evaluation unit being operable to automatically evaluate said combined speed signal to generate responsive thereto a speed adjustment signal, said speed adjustment signal being incorporated by said controller to adjust said speed control signal to dynamically compensate for run out; and,
   (e) a relay amplifier and an output combiner coupled thereto, said relay amplifier being operable to compare a run out elimination signal received from said general evaluation unit with a preset synchronization signal to generate for said output combiner a real output signal.

3. The system for eliminating the effects of run-out on a sledge server as recited in claim 2 further comprising a play module coupled to said output combiner, said output combiner being operable to combine said real output signal with an output signal of said play module to generate an output position control signal.

4. The system for eliminating the effects of run-out on a sledge server as recited in claim 3 wherein said play module includes a first controller and first and second amplifiers coupled in cascade to said sledge server motor; and, a second controller and a sledge motor brake disposed in an operational branch extending in parallel to said first and second amplifiers and said sledge server motor.

* * * * *